United States Patent [19]
Rembold et al.

[11] Patent Number: 5,665,318
[45] Date of Patent: Sep. 9, 1997

[54] ARRANGEMENT FOR TREATMENT OF EXHAUST GASES FOR A COMPRESSION-IGNITION INTERNAL COMBUSTION ENGINE

[75] Inventors: Helmut Rembold, Stuttgart; Hubert Dettling, Waiblingen; Heinz Stutzenberger, Vaihingen, all of Germany

[73] Assignee: Robert Bosch GmbH, Stuttgart, Germany

[21] Appl. No.: 542,116

[22] Filed: Oct. 12, 1995

[30] Foreign Application Priority Data

Oct. 12, 1994 [DE] Germany .................. 44 36 415.6

[51] Int. Cl.[6] .................. B01D 50/00; F01N 3/10
[52] U.S. Cl. .................. 422/177; 422/180; 60/301; 60/303
[58] Field of Search ............ 422/177, 180; 60/286, 288, 301, 303

[56] References Cited

U.S. PATENT DOCUMENTS

| | | | |
|---|---|---|---|
| 3,908,371 | 9/1975 | Nagai et al. | 60/301 |
| 4,125,997 | 11/1978 | Abthoff et al. | 60/289 |
| 4,449,362 | 5/1984 | Frankenberg et al. | 60/274 |
| 4,576,617 | 3/1986 | Renevot | 55/96 |
| 4,858,432 | 8/1989 | Knaur et al. | 60/303 |
| 4,982,565 | 1/1991 | Projahn | 60/303 |
| 5,067,320 | 11/1991 | Kanesaki | 60/297 |
| 5,201,802 | 4/1993 | Hirota et al. | 60/276 |
| 5,522,218 | 6/1996 | Lane et al. | 60/274 |

*Primary Examiner*—Nina Bhat
*Attorney, Agent, or Firm*—Edwin E. Greigg; Ronald E. Greigg

[57] ABSTRACT

An arrangement for the treatment of exhaust gases from a compression-ignition internal combustion engine, in which, fuel is metered via a metering valve and introduced into the exhaust system via an evaporator to promote the action of a reduction catalyst arranged on the downstream side of the engine.

17 Claims, 2 Drawing Sheets

5,665,318

ARRANGEMENT FOR TREATMENT OF EXHAUST GASES FOR A COMPRESSION-IGNITION INTERNAL COMBUSTION ENGINE

PRIOR ART

Due to the fact that exhaust gases are operated with a large excess of air, the exhaust gases of compression-ignition internal combustion engines tend toward a high $NO_x$ emission. This occurs to a greater degree in the case of internal combustion engines with direct injection into the combustion space. In order to reduce this emission, one possibility is to perform $NO_x$ reduction with the aid of a corresponding reduction catalyst. Suitable catalysts for this purpose are, for example, those based on zeolites. Another problem of compression-ignition internal combustion engines lies in the relatively low exhaust-gas temperature, which makes light-off of the reduction function of such a catalyst more difficult. To promote this reduction process, it has also already been proposed to connect the exhaust system to a burner which heats up the exhaust gases. To promote the reduction process, a proposal has already been made for an arrangement to treat exhaust gases from a compression-ignition internal combustion engines.

In such an arrangement, known from the publications by F. Schäfer and R. Van Basshuysen entitled "Schadstoffreduzierung und Kraftstoffverbrauch von PKW-Verbrennungsmotoren" [Pollutant reduction and fuel consumption in passenger-vehicle engines], page 115, published by Springer-Verlag, urea in aqueous solution is provided as the reducing agent and this is fed to the exhaust system upstream of the catalyst. This urea is metered in a complicated manner by means of a solenoid valve which is subject to the high operating temperatures in the region of the exhaust system and therefore tends to malfunction. The provision and control of this solenoid valve for metering in small amounts—in the range of 1.5 milligrams per working cycle of the internal combustion engine—is very expensive. Particularly for metering the urea dispensed by the solenoid valve, the provision of compressed air is required, said compressed air on the one hand transporting to the exhaust system the urea metered and on the other hand being used to generate pressure in order to raise the urea storage tank to the pressure required for injection at the solenoid valve. To ensure accuracy of metering, this pressure must be regulated. The pressure drop across the solenoid valve must furthermore guarantee the finely distributed preparation of the urea, such that the $NH_3$ required for the desired reduction of the $NO_x$ components in the exhaust gas will be formed at the latest in the catalyst by decomposition of the urea compound in conjunction with the action of heat.

This arrangement is very complex and requires a high exhaust-gas temperature to ensure that the reduction process is reliably carried out. There is the risk that, given an oversupply of urea or the absence of the operating requirements at the catalyst, urea or ammonia will not be completely converted and will thus pollute the environment as a component of the emissions.

EP-A-503 882 has furthermore disclosed the use of HC, i.e. fuel, as a reducing agent, this being introduced into the exhaust system of the internal combustion engine upstream of a $NO_x$ reduction catalyst of the zeolite type in a manner controlled by the temperature of the catalyst. Here, the metered addition is intermittent, the intention being that HC should be temporarily stored in the porous structure of the catalyst so that this HC is available for the conversion of $NO_x$ as the temperature of the catalyst rises. In addition to the disadvantageous use, already described above, of a solenoid valve and the associated expense, this arrangement has the disadvantage that the quantity of HC introduced cannot immediately bring about conversion of the $NO_x$ components but must first of all be conditioned in the catalyst. This may well be achievable in the case of the envisaged application of the known arrangements to an applied-ignition internal combustion engine, which, as is known, has high exhaust-gas temperatures. In the case of the relatively cooler exhaust gases of a compression-ignition internal combustion engine, this measure is inadequate.

ADVANTAGES OF THE INVENTION

In contrast, the arrangement according to the invention has the advantage that, despite the use of an intermittently operated electrically controlled valve, a reducing agent is introduced into the exhaust gas continuously and, what is more, advantageously already in vapor form, reliably guaranteeing thorough mixing with the exhaust gas and good distribution. This gives optimum reactions in the downstream reduction catalyst. A particularly advantageous embodiment of such an evaporator is obtained if a porous body is used. Such porous bodies are already widely used in the form of mass-produced sintered components in the region of high temperatures, making the implementation of the solution according to the invention unproblematic. The demands on the electrically controlled valve are very small, so that valves which are already commercially available, such as injection valves for petrol injection, can be used at an operating pressure of a few bar. Care must merely be taken to ensure that the outlet cross section is small enough for the required quantities to be metered within the cycle of the valve.

A known electrically heated pencil-type heater plug, which projects into the hollow body and very largely fills the interior space of the hollow body, is advantageously used as a heating device. Such pencil-type heater plugs, the familiar glow plugs, can be obtained as a mass-produced product as a starting aid for compression-ignition internal combustion engines and permit an economical solution for the arrangement according to the invention. The pencil-type heater plug is advantageously exchangeable and, for this purpose, is, insertable into a connecting pedestal by means of which the hollow body configured the form of a sintered part, is connected to the wall of the exhaust-gas-carrying parts of the internal combustion engine. It is also particularly advantageous here to use fuel as a reducing agent, fuel which is already available in the case of the associated diesel internal combustion engine and, by burning, on the one hand increases the temperature of the catalyst and makes available ions with the aid of which the reduction of $NO_x$ components in the catalyst can be performed in an effective manner. An exhaust-gas heating device can advantageously be provided in addition and, by means of this device, the time up to the effective entry into service of the reduction catalyst can be considerably shortened, particularly when starting the internal combustion engine while it is still cold. According to the invention, an oxidation catalyst is arranged on the downstream side for complete conversion of all components of the exhaust gases which are still burnable in the catalytic reactor.

BRIEF DESCRIPTION OF THE DRAWING

An exemplary embodiment of the invention is depicted in the drawing and is explained in greater detail in the description which follows.

DETAILED DESCRIPTION OF THE EXEMPLARY EMBODIMENT

Figure 1:
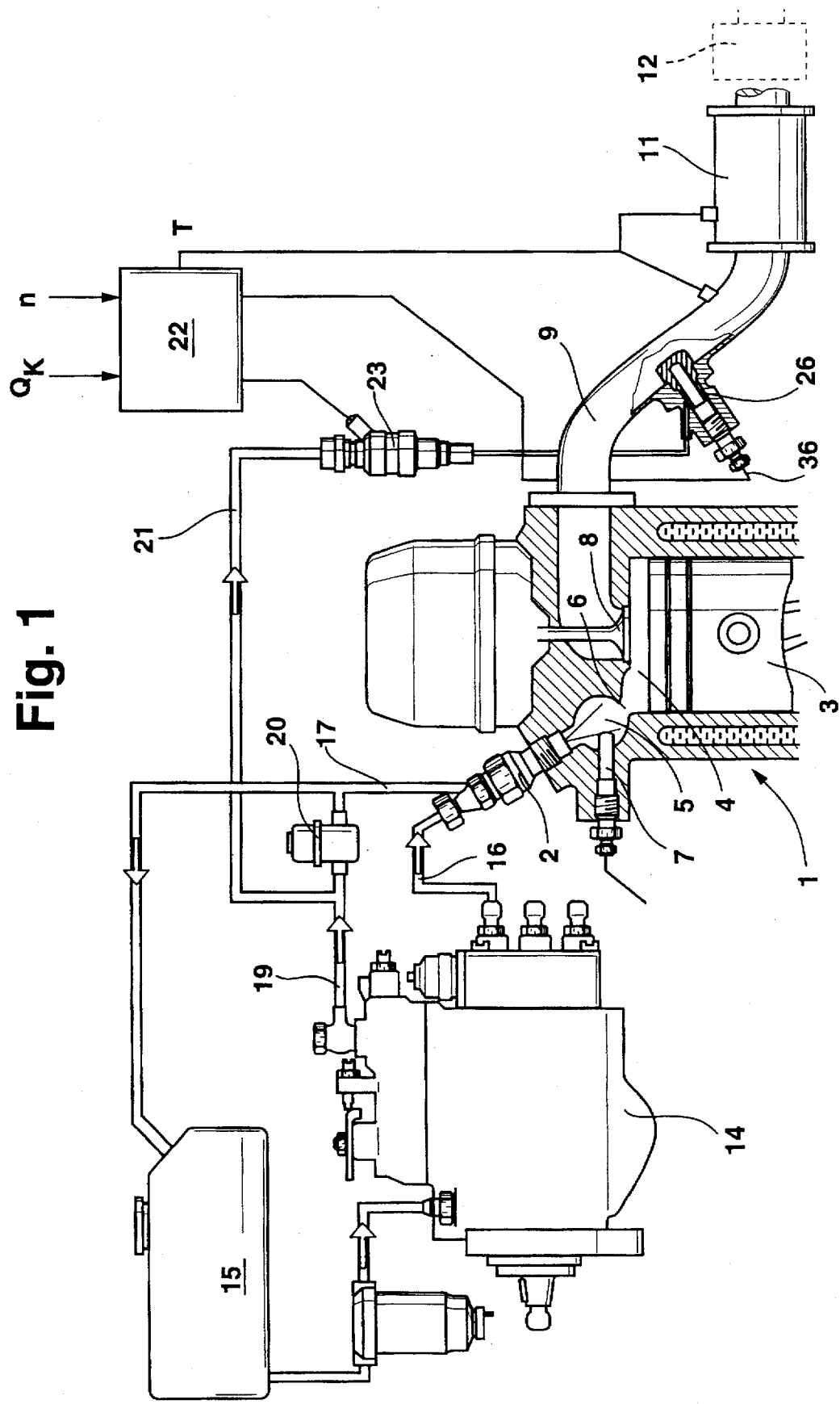
FIG. 1 shows the schematic representation of a fuel supply system of a compression-ignition internal combustion engine complemented by the device according to the invention.

The drawing shows, schematically, a section through part of a cylinder 1 of a compression-ignition internal combustion engine. In this exemplary embodiment, the engine is a compression-ignition internal combustion engine with indirect injection, i.e. the fuel is injected by means of an injection valve 2 not directly into the main combustion space 4 bounded directly by the piston 3 of the internal combustion engine but into a swirl chamber 5 which is arranged ahead of the said space and is connected to the main combustion space 4 by a transfer passage 6. A glow plug 7 projecting into this swirl chamber is provided as a starting aid. Following completion of the expansion stroke, the components of the fuel injected and air which are burnt in the swirl chamber and the main combustion space are expelled via an exhaust valve 8 into an exhaust duct 9 by the exhaust stroke of the piston 3 of the internal combustion engine. In general, the exhaust duct 9 is combined into an exhaust manifold which comprises a plurality of ducts, each leading off from one engine cylinder, and merges into a collecting pipe which leads into the open via one or more lines. In the example illustrated, a reduction catalyst 11 is arranged in the exhaust collecting pipe and, as indicated in dotted lines, has an oxidation catalyst and, if required, the customary muffler device of the exhaust system of an internal combustion engine connected to it on the outlet side.

Fuel is supplied to the injection valve 2 of each cylinder by means of a fuel injection pump 14 which receives fuel from a fuel tank 15 and meters the fuel, which is raised to high pressure, via injection lines 16 and feeds it in turn to each of the injection valves 2. Excess fuel from the individual injection valves is returned to the fuel tank via leak-off lines 17.

Figure 2:
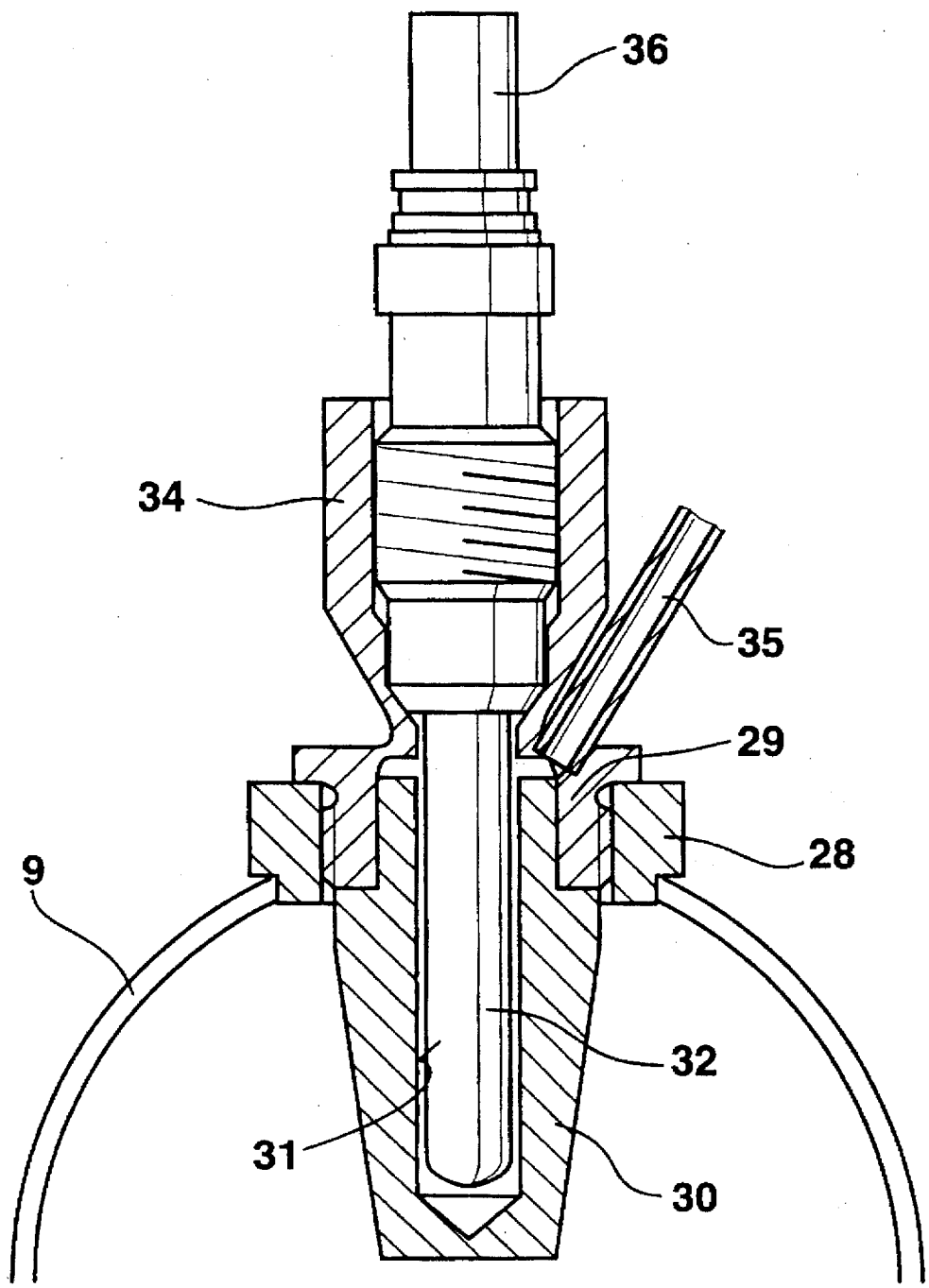
FIG. 2 shows a section through the hollow body according to the invention for the preparation of the reducing agent.

For the delivery of the fuel from the fuel tank to an internal inlet space, the fuel injection pump is connected to a presupply pump (not shown in detail), a fuel pressure controlled as a function of the engine speed generally being maintained in the inlet space in order to control functions dependent on engine speed. The overflow pressure for controlling this inlet-space pressure escapes, generally unpressurized, back to the fuel tank 15 via the overflow line 19. In the present example, however, a pressure regulator 20 is arranged in the overflow line 19 and this can, for example, be set to 0.3 bar, so that a supply pressure of 0.3 bar is available upstream of this pressure regulator 20. Via a fuel line 21, this pressure is fed to an electrically controlled metering valve 23 which, under the control of a control device 22, feeds fuel as a reducing agent to an evaporator 26 as a function of operating parameters such as load ($Q_x$) and engine speed (n). This evaporator is located in the exhaust duct upstream of the reduction catalyst 11. The construction of this evaporator can be seen in detail from FIG. 2. Provided for this purpose in the wall of the fuel duct 9, is a screw-in sleeve 28 into which a connecting pedestal 29 can be screwed in leaktight fashion. Inserted into this connecting pedestal is a hollow body 30 which projects into the exhaust stream in the exhaust duct 9. This hollow body has a porous heat-resistant wall and can be composed, for example, of sintered material, sintered bronze or ceramic and, in the interior, has a blind hole 31 into which an elongated heater plug 32, which matches the blind hole in shape and fills it, projects as a heating device. This heater plug is screwed into a sleeve part 34 of the connecting pedestal 29 from outside the exhaust duct, coaxially with respect to the hollow body 30, which is of rotationally symmetrical design, such that the interior space remaining between the blind hole 31 and the heater plug 32 is sealed off in leaktight fashion from the outside, outside the exhaust duct 9. Opening into the blind hole 31 there is furthermore a connecting line 35 which leads from the metering valve 23 and carries the reducing agent, the diesel fuel, dispensed by the metering valve 23 into the remaining cavity in the blind hole 31.

The elongated heater plug 32 is heated by way of a control line 36 from the control device 24.

The catalyst 11 is designed as a reduction catalyst and serves to reduce the $NO_x$ components in the exhaust gas from the internal combustion engine. The internal combustion engine under consideration is a compression-ignition internal combustion engine, which, as is known, operates with a considerable excess of oxygen and, owing to this combustion method, has a considerable proportion of $NO_x$ components in the exhaust gas. This proportion is already large with an internal combustion engine which operates with the swirl-chamber combustion method shown and this proportion is even larger in the case of internal combustion engines in which injection is directly into the main combustion space 4. Because of the large excess of air, which is still present in the exhaust gas and results in an extremely small proportion of CO in the exhaust gas, it is not possible to achieve to a satisfactory extent the reduction of the $NO_x$ components which could be carried out effectively with this CO. Another factor which creates difficulties is that the exhaust gases of compression-ignition internal combustion engines are at a considerably lower temperature than those in applied-ignition internal combustion engines and this temperature makes the light-off behavior of a downstream catalyst and a high efficiency of this catalyst considerably more difficult. These disadvantages are countered by the introduction of reducing agent. The fuel introduced promotes reduction in the catalyst in an effective manner. There is, at the same time, also a thermal conversion of fuel in the catalyst, increasing the working temperature of the catalyst and its efficiency. To this end, an increase in efficiency requires that the reducing agent introduced should enter the exhaust gas in finely divided and rapidly convertible form. It is also important that precisely the required amount of reducing agent for effective exhaust-gas detoxification is introduced. With the aid of the electrically controlled valve 23, piloted by means of the control device 24, the respectively required quantity of reducing agent is introduced to match the volume of exhaust gas, determined from the load and engine speed, the amount also taking into account the temperature T of the exhaust gas and/or of the catalyst.

The good preparation of the fuel used here as a reducing agent is accomplished by means of the evaporator 26, the quantity of fuel having been controlled with the aid of the abovementioned valve 23. The evaporator emits fuel only in vapor form and this passes into the exhaust gas through the porous wall of the hollow body. This hollow body is heated, on the one hand, by the exhaust gas and, on the other hand, also by the elongated heater plug 32, particularly in the starting phase of the internal combustion engine, as long as the temperature of the exhaust gas is too low to bring about an evaporation process. The heating is likewise controlled as a function of the parameters mentioned, and continuous addition of fuel in vapor form to the exhaust gab in the required amount is thus guaranteed.

The metering valve is advantageously supplied by the fuel circuit of the fuel injection pump, which is necessary in any case to operate the internal combustion engine. With the aid of the pressure regulator 20, the required low pressure is available without any major additional expenditure. The metering valve can advantageously be a low-pressure injection valve which can easily be modified by reducing the outlet opening to a single hole and is available as an inexpensive mass-produced part. Elongated heater plugs are likewise mass-produced parts which can be used at low cost. By virtue of the control mentioned, which aids the efficiency of reduction but also avoids excess HC entering the environment as emissions, only a small additional consumption of fuel is required for the operation of the reduction catalyst.

The foregoing relates to preferred exemplary embodiments of the invention, it being understood that other variants and embodiments thereof are possible within the spirit and scope of the invention, the latter being defined by the appended claims.

We claim:

1. An arrangement for treating exhaust gases of a compression-ignition internal combustion engine comprising an exhaust-gas collecting system (9) including a reduction catalyst (11) for the reduction of $NO_x$ components of the exhaust gas from the internal combustion engine, an electrically controlled valve (23) as a metering device for a metered introduction of a reducing agent into a stream of the exhaust gas supplied to the catalyst (11) as a function of operating values, stored in a control device, for the $NO_x$ content of the exhaust gas given various operating parameters of the internal combustion engine and of the catalyst, and with an evaporator device (26), said evaporator device communicates with said controlled valve (23) via a connecting line (35) for vaporizing the reducing agent introduced in vapor form into the exhaust-gas stream, said evaporating device includes a hollow body (30) which projects into the exhaust-gas stream, the hollow body includes a heating device (32) in an interior space (31) which is separated from the exhaust-gas stream by a porous wall, a reducing agent is introduced into the interior space, the reducing agent is heated to an evaporation temperature and then introduced into the exhaust gas.

2. The arrangement as claimed in claim 1, wherein a heating body (32) projecting into the interior space is provided as the heating device.

3. The arrangement as claimed in claim 2, wherein an inner wall of the hollow body surrounds the heating body with a small clearance.

4. The arrangement as claimed in claim 2, wherein the heating body is an electrically heated elongated heater plug (32).

5. The arrangement as claimed in claim 4, wherein the elongated heater plug is connected exchangeably to a fastening element (29, 34).

6. The arrangement as claimed in claim 5, wherein the porous wall is a sintered part.

7. The arrangement as claimed in claim 5, wherein the hollow body is connected by way of a connecting pedestal (29) to a wall of the exhaust-carrying system (5), into which wall the elongated heater plug (32) is screwed by means of said connecting pedestal.

8. The arrangement as claimed in claim 4, wherein diesel fuel is used as the reducing agent.

9. The arrangement as claimed in claim 5, wherein diesel fuel is used as the reducing agent.

10. The arrangement as claimed in claim 6, wherein diesel fuel is, used as the reducing agent.

11. The arrangement as claimed in claim 4, wherein an oxidation device (12) for a reoxidation of the exhaust gas is provided in the exhaust-collecting system downstream of the catalyst.

12. The arrangement as claimed in claim 5, wherein an oxidation device (12) for a reoxidation of the exhaust gas is provided in the exhaust-collecting system downstream of the catalyst.

13. The arrangement as claimed in claim 6, wherein an oxidation device (12) for a reoxidation of the exhaust gas is provided in the exhaust-collecting system downstream of the catalyst.

14. The arrangement as claimed in claim 1, wherein diesel fuel is used as the reducing agent.

15. The arrangement as claimed in claim 14, wherein an oxidation device (12) for a reoxidation of the exhaust gas is provided in the exhaust-collecting system downstream of the catalyst.

16. The arrangement as claimed in claim 1, wherein an oxidation device (12) for a reoxidation of the exhaust gas is provided in the exhaust-collecting system downstream of the catalyst.

17. The arrangement as claimed in claim 16, wherein the device for reoxidation is an oxidation catalyst (12).

* * * * *